(12) United States Patent
Tamatani et al.

(10) Patent No.: US 8,538,182 B2
(45) Date of Patent: Sep. 17, 2013

(54) IMAGE DATA DECODING DEVICE

(75) Inventors: Mitsuyuki Tamatani, Kanagawa (JP);
Kazuo Yamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 312 days.

(21) Appl. No.: 12/912,288

(22) Filed: Oct. 26, 2010

(65) Prior Publication Data

US 2011/0311151 A1    Dec. 22, 2011

(30) Foreign Application Priority Data

Jun. 21, 2010    (JP) .................................. 2010-140992

(51) Int. Cl.
*G06K 9/36*    (2006.01)
(52) U.S. Cl.
USPC ....................................... 382/250
(58) Field of Classification Search
None
See application file for complete search history.

(56) References Cited

U.S. PATENT DOCUMENTS

| 6,381,031 | B1 | 4/2002 | Mishima | |
|---|---|---|---|---|
| 2007/0154102 | A1* | 7/2007 | Okada et al. | 382/232 |
| 2008/0101706 | A1 | 5/2008 | Maeda | |

FOREIGN PATENT DOCUMENTS

| JP | A-11-41429 | 2/1999 |
|---|---|---|
| JP | A-2008-113189 | 5/2008 |
| JP | A-2009-3765 | 1/2009 |

* cited by examiner

*Primary Examiner* — Stephen R Koziol
*Assistant Examiner* — Amandeep Saini
(74) *Attorney, Agent, or Firm* — Oliff & Berridge, PLC

(57)    ABSTRACT

An image data decoding device includes a determination unit, a first pixel value generating unit, and a second pixel value generating unit. The determination unit receives compressed image data including information of one DC component, information of frequency components and a block end code for each block of an image as a result of frequency analysis and determines whether the block consists of the DC component and the block end code. The first pixel value generating unit performs inverse operation to the frequency analysis to generate pixel values of the block when the block is determined as not consisting of the DC component and the block end code. The second pixel value generating unit generates one and the same pixel value for all pixels of each block based on information of the DC component when the block is determined as consisting of the DC component and block end code.

4 Claims, 16 Drawing Sheets

IMAGE DATA DECODING DEVICE

CROSS-REFERENCE TO RELATED APPLICATIONS

This application is based upon and claims priority under 35 USC 119 from Japanese Patent Application No. 2010-140992, filed Jun. 21, 2010.

BACKGROUND

1. Technical Field

The present invention relates to an image data decoding device.

2. Related Art

Of decoding devices for decompressing and decoding image data compressed and encoded in accordance with a compression method such as JPEG (Joint Photographic Experts Group), some decoding devices operate a plurality of decompressors in parallel to perform a decompressing/decoding process at a higher speed.

SUMMARY OF THE INVENTION

According to an aspect of the invention, an image data decoding device includes a determination unit, a first pixel value generating unit, and a second pixel value generating unit. The determination unit receives compressed image data including information of one DC component, information of frequency components other than the DC component and a block end code for each block of an image as a result of frequency analysis of pixel values in each of the blocks and determines each of the blocks of the received compressed image data sequentially in order from a head block of the blocks as to whether the block consists of the DC component and the block end code or not, the image data consisting of the information of the DC component and the block end code for each block when all the frequency components are zero. The first pixel value generating unit performs inverse operation to the frequency analysis on the DC component and the frequency components other then the DC component included in each block so as to generate pixel values of the block when the block is determined as not consisting of the DC component and the block end code by the determination unit. The second pixel value generating unit generates one and the same pixel value for all pixels of each block based on information of the DC component when the block is determined as consisting of the DC component and a block end code by the determination unit.

BRIEF DESCRIPTION OF THE DRAWINGS

Exemplary embodiments of the invention will be described in detail based on the following figures, wherein.

DETAILED DESCRIPTION

Figure 1:
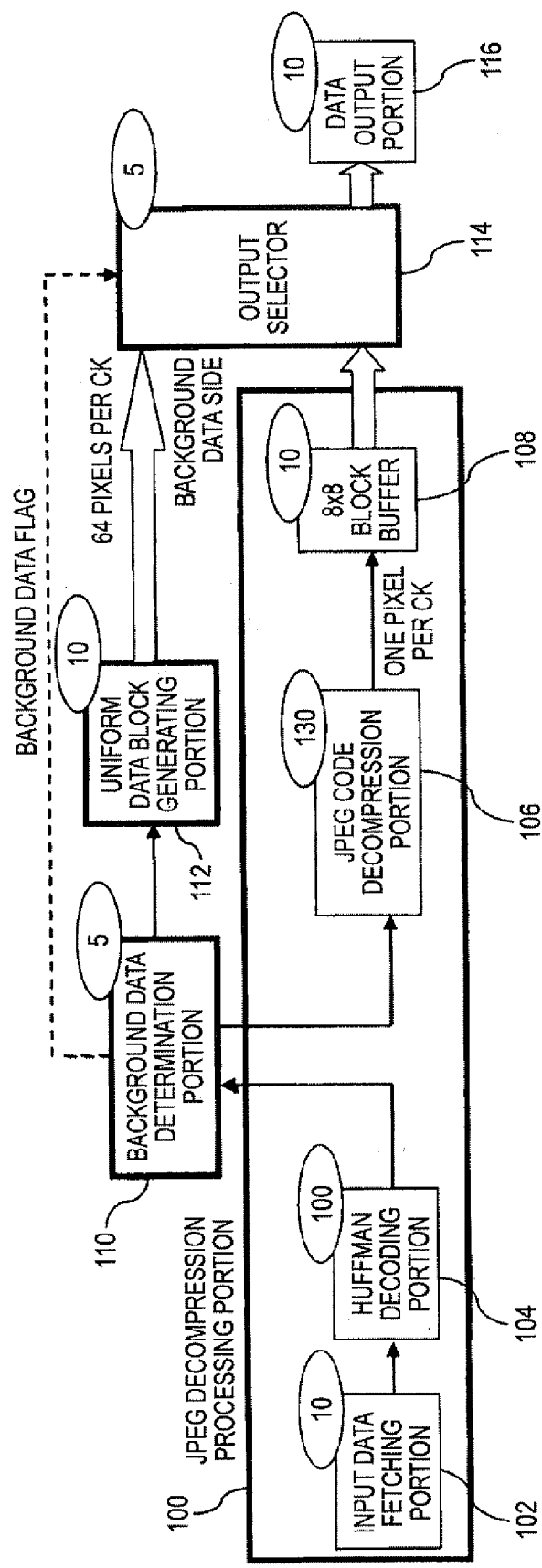
FIG. 1 is a diagram showing a configuration example of an image data decoding device according to an exemplary embodiment.

A configuration example of an image data decoding device according to an exemplary embodiment will be described with reference to FIG. 1. Here, description will be made on a device which decodes data compressed by a JPEG method, by way of example. The image data decoding device in FIG. 1 has a JPEG decompression processing portion 100, a background data determination portion 110, a uniform data block generating portion 112, an output selector 114 and a data output portion 116.

The JPEG decompression processing portion 100 is a circuit for decompressing JPEG-compressed image data in accordance with the JPEG method. The JPEG decompression processing portion 100 has an input data fetching portion 102, a Huffman decoding portion 104, a JPEG code decompression portion 106 and an 8×8 block buffer 108.

The input data fetching portion 102 is a circuit for receiving JPEG-compressed image data to be decoded.

Roughly speaking, in image compression by the JPEG method, as known well, bit map image data is divided into blocks each including 8×8 pixels, and DCT (Discrete Cosine Transform) is performed on each block to transform the block into 8×8 frequency components in a frequency domain. Of those frequency components, the lowest frequency (e.g. frequency zero) component is a DC component, which expresses an average of pixel values in the block. 63 frequency components higher than the DC component are called AC components. Each frequency component obtained as a result of the DCT is quantized using a quantization table. When quantized components of one block are arranged in zigzag scan order, data starting at a DC component followed by AC components is typically obtained. The quantized results of the components arranged in zigzag scan order are Huffman-coded to obtain final JPEG compressed image data. In the Huffman coding process, the DC component alone (or a difference between the DC component and a DC component in a previous block in some cases) is transformed into a Huffman code. Most of the AC components following the DC component have a value of 0 due to the quantization. Accordingly, the number of consecutive 0 (called zero run) and values of non-zero components following the zero run are arranged as a set and Huffman-coded. In such a manner, an image of one block is finally transformed into Huffman-coded data in which one Huffman code of a DC component is followed by a set of Huffman codes (whose number is 0 or more) including a zero run and non-zero AC components. Here, according to this Huffman coding process, when all the components on and after a certain frequency component (quantized result) in the zigzag scan order have a value of 0, the high frequency components on and after the frequency component are expressed by one block end code (called an EOB (abbreviation of End Of Block) marker) in a lump, so as to reduce the data volume.

Figure 2:
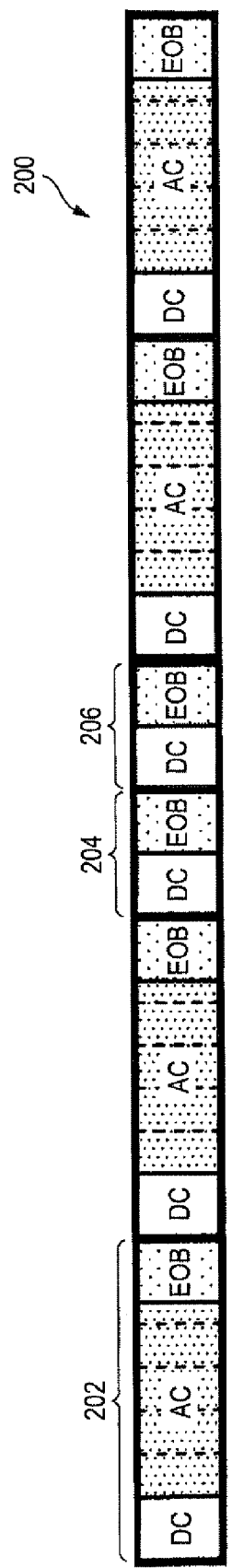
FIG. 2 is a diagram schematically showing an example of an output data string of a Huffman decoding portion of the image data decoding device.

The Huffman decoding portion 104 decodes the Huffman codes which form such JPEG-compressed image data, sequentially. FIG. 2 shows an example of a decoding result 200 obtained by the Huffman decoding portion 104. As shown in the example, one block of data is designated as the reference numeral 202, 204, 206 or the like. One block of data generally includes a DC component at its head and an EOB marker at its tail as described above. A typical block 202 includes one or more AC components between the DC component and the EOB marker, but there may be some blocks 204 and 206 each of which does not have any AC component but only a DC component. In such a block 204, 206, a DC component value (also called a DC coefficient) is immediately followed by an FOB marker.

The JPEG code decompression portion 106 performs inverse quantization or IDCT (Inverse Discrete Cosine Transform) on data obtained as a result of Huffman decoding, so as to obtain a pixel value of each pixel of one block (8×8 pixels).

Figure 3:
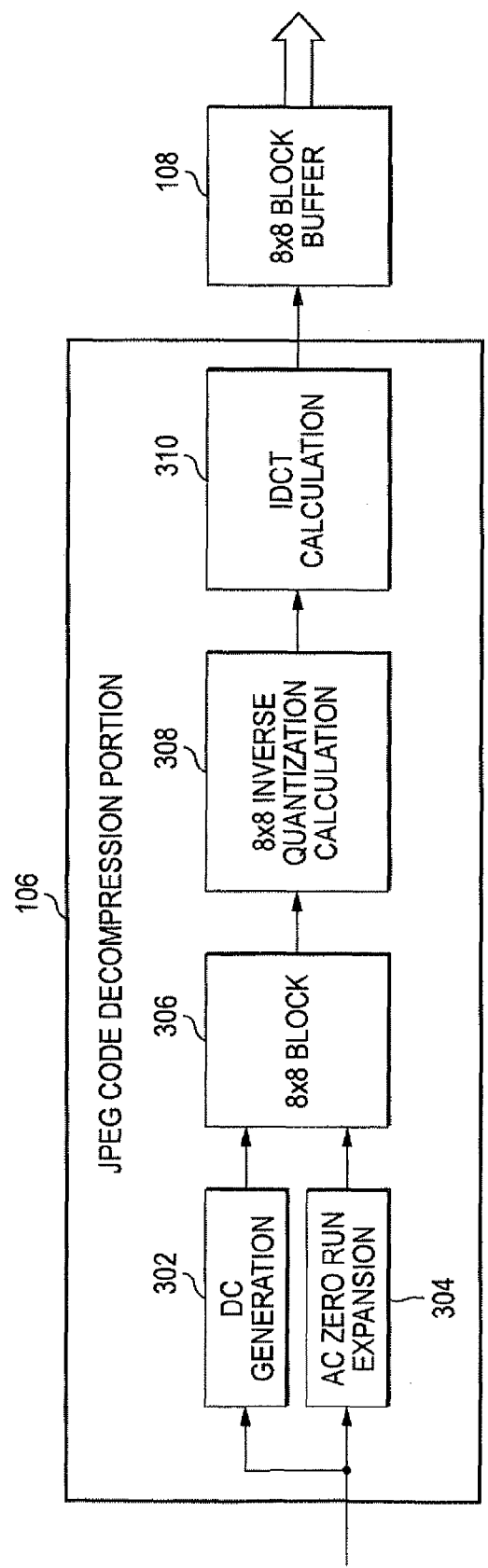
FIG. 3 is a diagram showing an example of an internal configuration of a JPEG code decompressing portion.

FIG. 3 shows an example of an internal configuration of the JPEG code decompression portion 106. As shown in FIG. 3, a DC generating circuit 302 of the JPEG code decompression portion 106 extracts a DC component value from the head of data in each block obtained as a result of Huffman decoding, and writes the extracted DC component value as a component in the left upper corner of an 8×8 block (a circuit for storing 8×8 frequency components) 306. An AC zero run expansion circuit 304 writes a zero run and non-zero AC components following the DC component into a corresponding area of the 8×8 block 306 where those components should be stored. An 8×8 inverse quantization calculation circuit 308 inversely quantizes the DC component and 63 AC components stored in the 8×8 block 306 with reference to an inverse quantization table. An IDCT calculation circuit 310 performs IDCT (Inverse Discrete Cosine Transform) on the thus inversely quantized DC component and 63 AC components so as to calculate pixel values of the block, that is, 8×8 pixels.

An 8×8 block buffer 108 temporarily holds pixel values of one block (8×8 pixels) obtained as a result of decoding (the output of the IDCT calculation circuit 310) by the JPEG code decompression portion 106. The pixel values of one block held by the 8×8 block buffer 108 are outputted to a data output portion 116 through an output selector 114. The data output portion 116 outputs the pixel values to an output-destination system such as a host system (e.g. an image processing application etc.), for example, which has issued a request for the decoding process to the image data decoding device.

The configuration of the JPEG decompression processing portion 100 (and the JPEG code decompression portion 106) described above may be almost the same as that of the background-art JPEG decoding device. In this exemplary embodiment, however, the output of the Huffman decoding portion 104 is supplied to the JPEG code decompression portion 106 not directly but through the background data determination portion 110.

The background data determination portion 110 determines whether the Huffman-decoded result of a block outputted from the Huffman decoding portion 104 expresses "background" (that is, a block having a DC component directly followed by an EOB marker) or not. When a DC component is directly followed by an EOB marker, only the DC component is present in the block. Therefore, all the 8×8 pixels of the block have a uniform value indicated by the DC component. Such a block where all the pixels have a uniform value in this manner is an unpatterned block, which is called "background" block. The background data determination portion 110 supplies data of a block determined as not background to the JPEG code decompression portion 106, and supplies data of a block determined as background to the uniform data block generating portion 112.

Based on the block data (including only the DC component in this case) supplied from the background data determination portion 110, the uniform data block generating portion 112 generates data of a block all the 8×8 pixels of which have a one and the same pixel value corresponding to the DC component, and outputs the generated data to the output selector 114. Those pixel values of one block are outputted to the data output portion 116 through the output selector 114 and outputted to an output system through the data output portion 116.

The output selector 114 receives a background data flag (flag data indicating a determination result of whether a block is "background" or not) supplied from the background data determination portion 110. When the determination result indicates the block is "not background", the output selector 114 selects the 8×8 block buffer 108. When the determination result indicates the block is "background", the output selector 114 selects the uniform data block generating portion 112. The output selector 114 outputs, to the data output portion 116, pixel values supplied from the selected portion.

Figure 4:
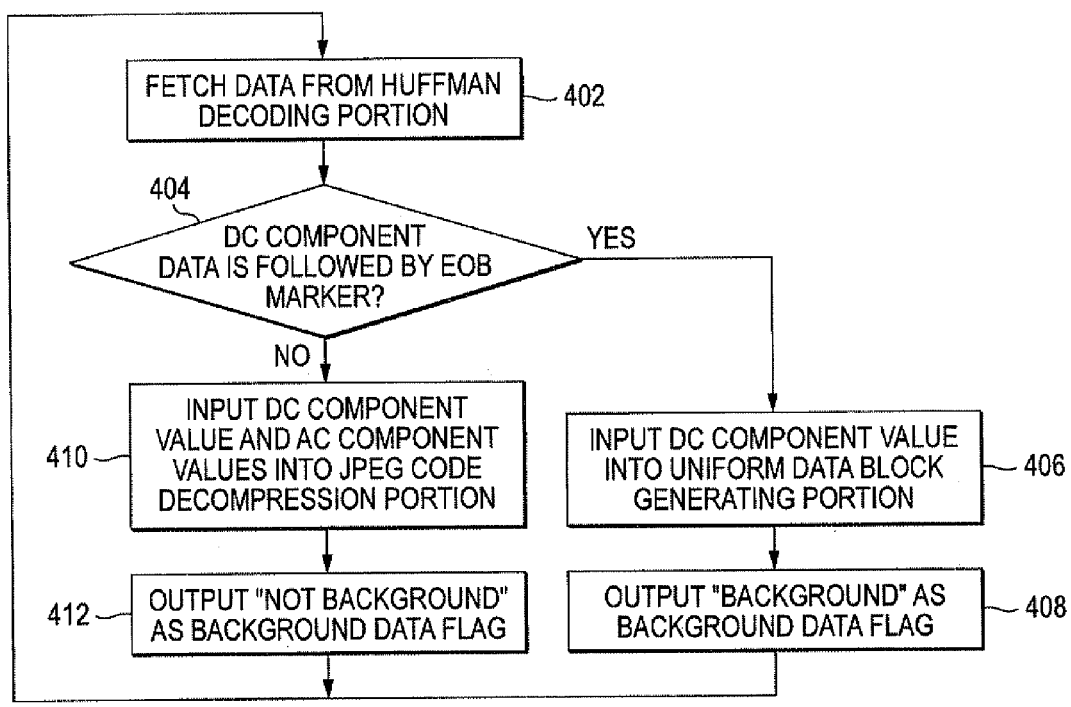
FIG. 4 is a flow chart showing an example of a processing procedure of a background data determination portion.

Next, an example of the processing procedure executed by the background data determination portion 110 will be described with reference to FIG. 4. In this procedure, on receiving a block of data as a result of Huffman decoding from the Huffman decoding portion 104 (402), the background data determination portion 110 determines whether a DC component as the head of the data is directly followed by an EOB marker (without any AC component) in the data or not (404). When it is concluded in this determination that a DC component is directly followed by an EOB marker (that is, the block is "background"), the background data determination portion 110 supplies the value of the DC component to the uniform data block generating portion 112 (406), and outputs, to the output selector 114, a background data flag whose value indicates that the block is "background" (408) (the order of Steps 406 and 408 may not be the aforementioned order). As a result, the output selector 114 selects the uniform data block generating portion 112 as a source of supply of output data so that a block of uniform pixels values generated by the uniform data block generating portion 112 correspondingly to the DC component is outputted to the outside through the output selector 114 and the data output portion 116.

On the other hand, when it is concluded in Step 404 that a DC component is not directly followed by an EOB marker (that is, there are AC components, or the block is not background), the background data determination portion 110 supplies the DC component value and the AC component values in the block to the JPEG code decompression portion 106 (410), and outputs, to the output selector 114, a background data flag whose value indicates that the block is "not background" (412) (the order of Steps 410 and 412 may not be the aforementioned order). As a result, the output selector 114 selects the 8×8 block buffer 108 as a source of supply of output data so that pixel values obtained as a result of JPEG decompression by the JPEG code decompression portion 106 are outputted to the outside through the output selector 114 and the data output portion 116.

Figure 5:
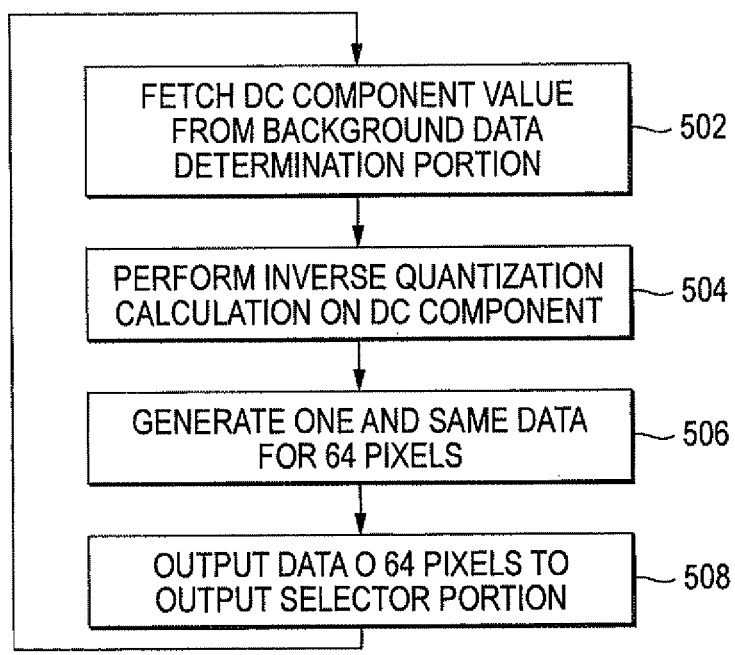
FIG. 5 is a flow chart showing an example of a processing procedure of a uniform data block generating portion.

Next, an example of the processing procedure executed by the uniform data block generating portion 112 will be described with reference to FIG. 5. In this procedure, on being supplied with the value of the DC component from the background data determination portion 110 (502), the uniform data block generating portion 112 inversely quantizes the DC component (504) and generates a block of data in which all the 8×8 pixels have the inversely quantized value of the DC component (506). The uniform data block generating portion 112 outputs the block of data to the output selector 114 (508).

When the DC component has been differentially coded, for example, the background data determination portion 110 may always hold the DC component value of the latest block and apply a differential value expressed by a DC component value of a block newly supplied this time, to the held DC component value so as to obtain a DC component value of the newly supplied block.

Here, the procedures of processing executed by the background data determination portion 110 and the uniform data block generating portion 112 have been shown. As is obvious to those skilled in the art, those procedures can be, of course, mounted as software or may be mounted as logical circuits of hardware.

According to this exemplary embodiment, the uniform data block generating portion 112 just has to write a one and the same pixel value corresponding to a DC component value supplied from the background data determination portion 110 into all the pixels (the memory area holding the values of all the pixels) of one block. Accordingly, processing can be performed at an extremely high speed. When a communication path between the uniform data block generating portion 112 and the output selector 114 has at least a bandwidth wide enough to transfer values of 64 pixels in one clock, one block of data generated by the uniform data block generating portion 112 can be transmitted to the output selector 114 in one clock.

On the other hand, in the decompression processing performed by the JPEG code decompression portion 106, data of each block inputted sequentially are inversely quantized and transformed by IDCT sequentially in order from a frequency component at the head of the block. Therefore, a value of one pixel is generated in one clock fundamentally. Accordingly, it takes much longer time for decompression of one block than for the case where the uniform data block generating portion 112 generates a block of uniform pixel data.

Accordingly, the image data decoding device according to this exemplary embodiment achieves a higher processing speed for decoding images each of which has a large part as background. For example, background (e.g. blank) parts occupy large portions of documents used in offices. In addition, parts with uniform pixel values account for considerably large ratios of typical photographic images. Accordingly, the image data decoding device shows a high processing speed in decoding compressed data of a lot of document images and photographic images.

Figure 6:
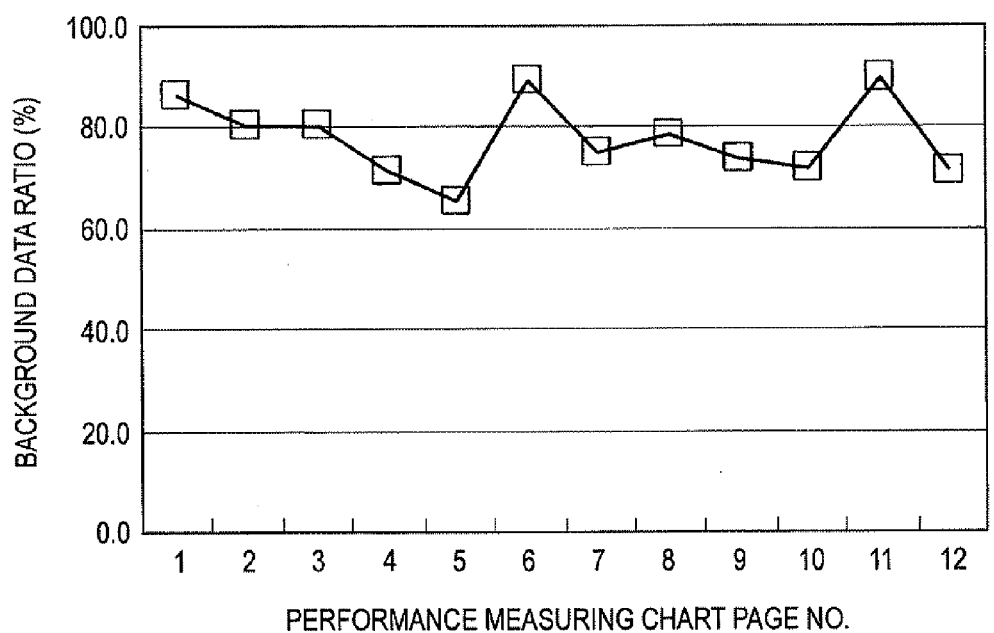
FIG. 6 is a graph showing a distribution of a background data ratio of each test chart used in examination for finding out the performance of the image data decoding device according to the exemplary embodiment.

The inventor performed examinations in which compressed image data of 12 performance measuring charts shown in FIG. 6 were decoded by a circuit mounted with a method according to this exemplary embodiment and two kinds of background-art circuits. FIG. 6 is a graph in which the ratio of background data (that is, the ratio of the number of blocks having no AC component to the total number of blocks in an image) in each numbered performance measuring chart is plotted. Of the ratios of background data in these performance measuring charts, even the lowest is beyond 60%, and the highest is close to 90%. One of the two background-art circuits to be compared is equivalent to the JPEG decompression processing portion 100 according to the exemplary embodiment (excluding the background data determination portion 110, the uniform data block generating portion 112, etc.). In the other background-art circuit, two portions equivalent to the JPEG decompression processing portion 100 are provided in parallel to be able to perform parallel processing.

Figure 7:
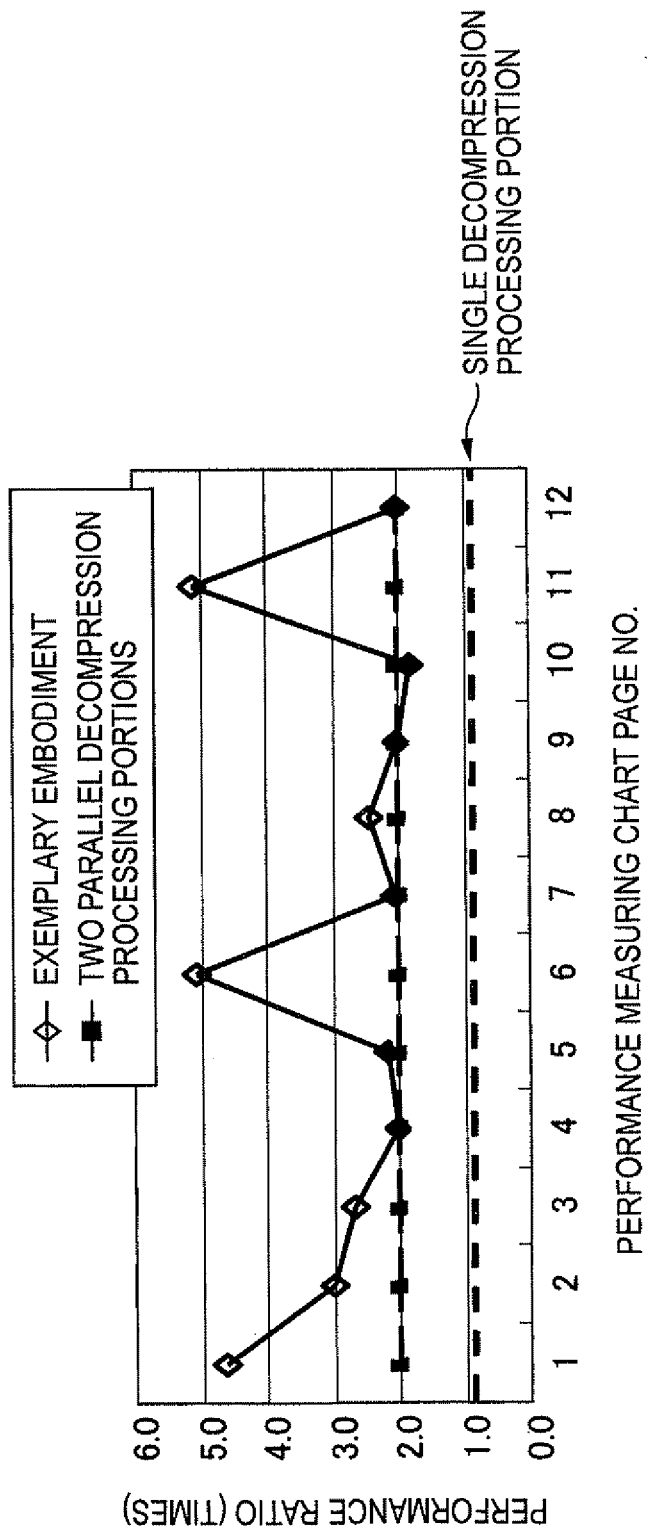
FIG. 7 is a graph showing a distribution of decoding speed performance in the case where compressed data of each test chart having a background data ratio shown in FIG. 6 is decoded by a circuit having a single JPEG decompression processing portion, a circuit having two JPEG decompression processing portions in parallel, and a circuit according to the exemplary embodiment.

FIG. 7 shows the results of the examinations. In the graph of FIG. 7, the abscissa designates the number of each performance measuring chart, and the ordinate designates the performance ratio in the configuration in which two JPEG image decompression processing portions are arranged in parallel and the performance ratio in the configuration according to this exemplary embodiment when the performance in the background-art configuration having only a single JPEG image decompression processing portion (referred to as reference configuration) is regarded as 1. The "performance" mentioned herein means shortness of time required for decoding compressed data of each performance measuring chart. When the time required for decoding in a configuration in question is half the time required for decoding in the reference configuration, the performance ratio in the configuration in question is 2. In FIG. 7, it is a matter of course that the performance in the two-parallel configuration is twice as high as the performance in the reference configuration due to two-parallel processing. It should be noted that the configuration according to this exemplary embodiment generally shows performance equal to or higher than that in the two-parallel configuration, and shows remarkably high performance particularly in the charts No. 1, 6 and 11 with high background data ratios.

In addition, in the configuration according to this exemplary embodiment, the mounting scale can be comparatively small when the configuration is mounted as a hardware circuit. The numeric value in an ellipse indicated in the shoulder of each block in the functional block diagram of FIG. 1 designates the number of PEs (Processor Elements) used for reconfiguration of the block on a DRP (Dynamically Reconfigurable Processor) by way of example. As known well, the DRP is a processor in which the combination of PEs in use or the wiring structure among the PEs is switched dynamically (that is, for example, in one clock) so that the internal logical circuit configuration can be reconfigured dynamically. As shown in FIG. 1, the Huffman decoding portion 104 and the JPEG code decompression portion 106 need large numbers (i.e. 100 and 130) of PEs respectively. On the other hand, the background data determination portion 110 and the uniform data block generating portion 112 need small numbers (i.e. 5 and 10) of PEs respectively. In addition, the output selector 114 can be also configured by five PEs. Accordingly, for example, when two pairs of JPEG decompression processing portions 100 and data output portions 116 corresponding thereto are arranged in a two-parallel configuration on a DRP, the required number of PEs is (10+100+130+10+10)×2=520. On the other hand, the number of PEs constituting the configuration according to this exemplary embodiment is (10+100+130+10)+5+10+5+10=280. For example, when a DRP has 500 PEs, the two-parallel configuration cannot be mounted on the DRP, but the configuration according to this exemplary embodiment can be mounted thereon.

In this manner, the image data decoding device according to this exemplary embodiment has a circuit scale approximately half as large as the background-art two-parallel configuration in which two JPEG decompression circuits are arranged in parallel and shows performance equal to or higher than that of the two-parallel configuration as to an image whose background ratio is not lower than 60%. In addition, the image data decoding device according to this exemplary embodiment shows higher performance on an image whose background ratio is higher.

When the image data decoding device according to this exemplary embodiment is mounted on a DRP, it may be conceived that the mounting scale can be further reduced by reconfiguration. Such an example will be described with reference to FIGS. 8 to 10.

In this example, the configuration shown in FIG. 1 is implemented by dynamically switching two configurations. One of the configurations is a configuration A shown in FIG. 8 and the other is a configuration B shown in FIG. 9. Those configurations are circuits which exist on the DRP simultaneously.

Figure 8:
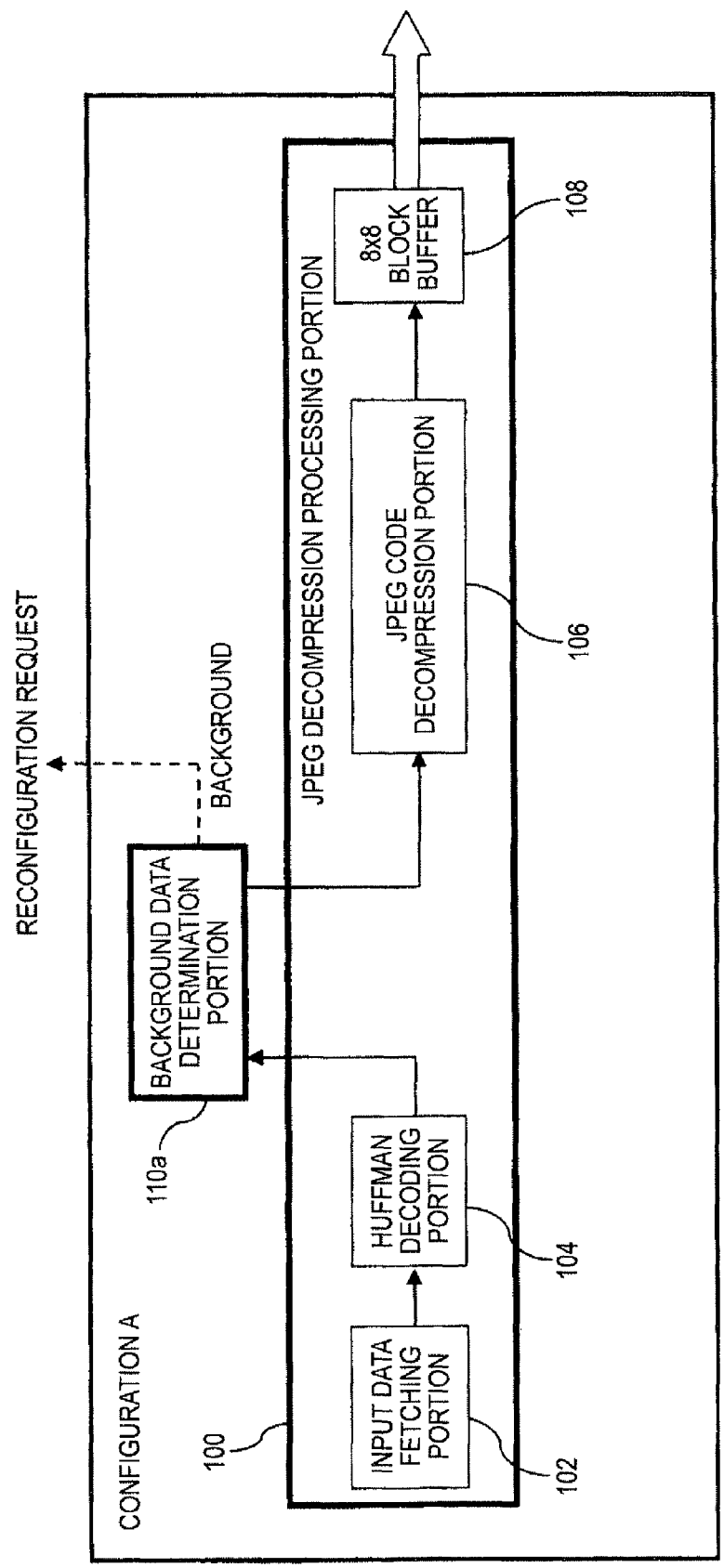
FIG. 8 is a diagram showing an example of a configuration which performs normal JPEG decompression when the image data decoding device according to the exemplary embodiment is divided into two configurations to be mounted on a DRP.

The configuration A shown in FIG. 8 is a circuit configuration for decoding not-background blocks (that is, blocks including AC components). The configuration A has a JPEG decompression processing portion 100 and a background data determination portion 110*a*. The JPEG decompression processing portion 100 is similar to that in FIG. 1. In the same manner as the background data determination portion 110 in FIG. 1, the background data determination portion 110*a* determines whether a block supplied from the Huffman decoding portion 104 is "background" or not. When the block is determined as "not background", the background data determination portion 110*a* supplies a DC component value and AC component values of the block to the JPEG code decompression portion 106. The background data determination portion 110*a* is different from the background data determination portion 110 in FIG. 1 at the following point. That is, when the block is determined as "background", the background data determination portion 110*a* issues, to a reconfiguration control portion (which will be described later), a reconfiguration request to switch to the configuration B for background data.

Figure 9:
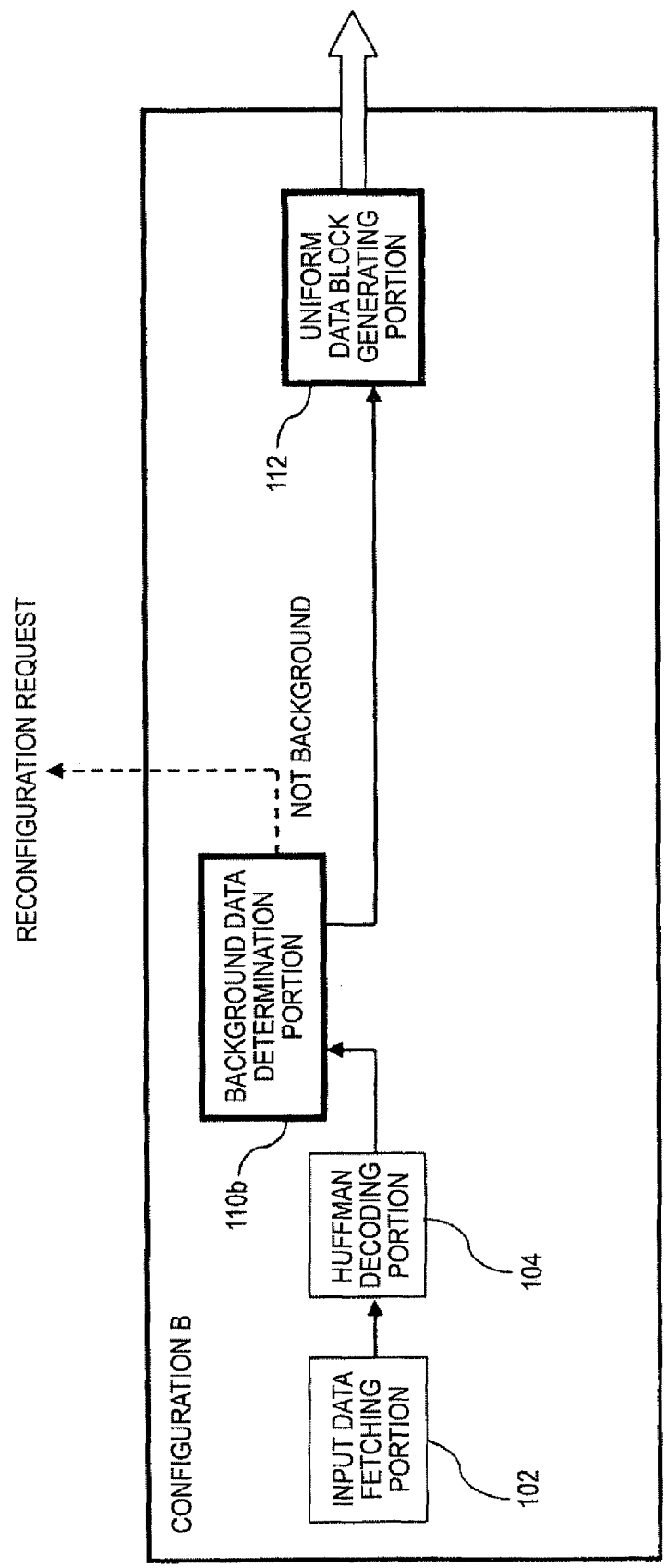
FIG. 9 a diagram showing an example of a configuration which performs a decompression process on background data when the image data decoding device according to the exemplary embodiment is divided into two configurations to be mounted on a DRP.

The configuration B shown in FIG. 9 has an input data fetching portion 102, a Huffman decoding portion 104, a background data determination portion 110*b* and a uniform data block generating portion 112. All the portions but the background data determination portion 110*b* may be identical to those elements with the same reference numerals shown in FIG. 1 respectively. In the same manner as the background data determination portion 110 in FIG. 1, the background data determination portion 110*b* determines whether a block supplied from the Huffman decoding portion 104 is "background" or not, and supplies a DC component value of the block to the uniform data block generating portion 112 when the block is determined as "background". The background data determination portion 110*b* is different from the background data determination portion 110 in FIG. 1 as follows. That is, when the block is determined as "not background", the background data determination portion 110*b* issues, to the reconfiguration control portion (which will be described later), a reconfiguration request to switch to the configuration A for not-background data.

Though not shown in FIGS. 8 and 9, an output selector 114 may be provided on the output side of the block buffer 108 and the uniform data block generating portion 112 in the same manner as in the example of FIG. 1. Alternatively, the outputs of the 8×8 block buffer 108 and the uniform data block generating portion 112 may be designed to be connected not through the output selector 114 but directly to the data output portion 116. In any case, the output selector 114 or the data output portion 116 does not have to be switched even when the configurations A and B are switched.

Figure 10:
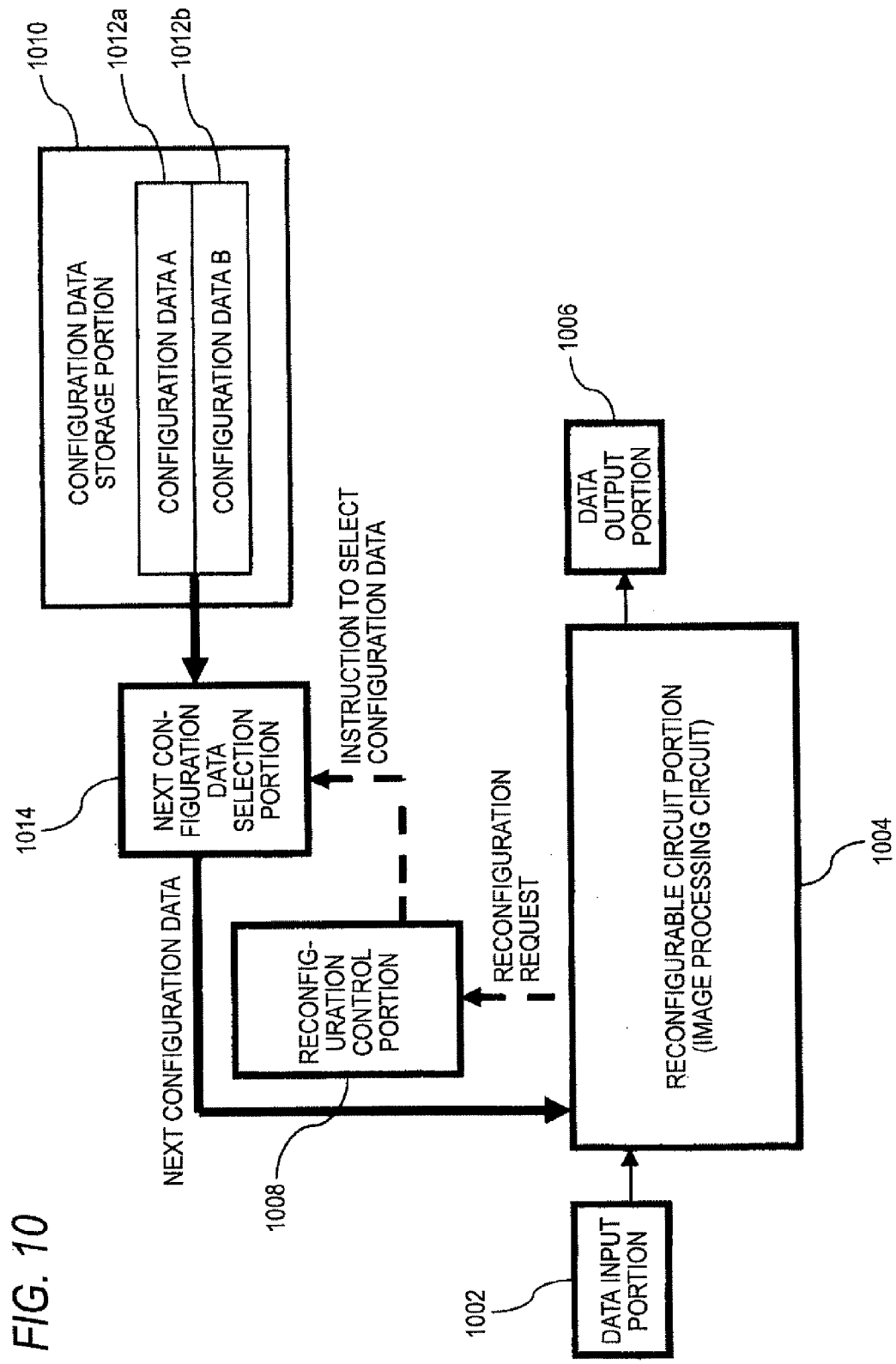
FIG. 10 is diagram showing an example of a system configuration in which the image data decoding device according to the exemplary embodiment is mounted on a DRP.

FIG. 10 shows an example of a DRP configuration for implementing such a configuration switching function.

In the DRP shown in FIG. 10, a reconfigurable circuit portion 1004 is a circuit which can reconfigure an internal logical circuit configuration dynamically (that is, during the operation of the processor). Various existing circuits such as a DNA introduced in JP-A-2009-3765 or circuits which will be developed in the future may be used as the reconfigurable circuit portion 1004. For example, the DNA is an array of a large number of circuit elements (PEs), in which the connection configuration among the circuit elements can be reconfigured at a high speed (e.g. in one clock) in accordance with configuration data. When a DAP DNA architecture introduced in JP-A-2009-3765 is used in this exemplary embodiment, a reconfiguration control portion 1008 and a next configuration data selection portion 1014 are implemented with a general-use processor core called DAP, which executes programs showing functions which will be described later. In this case, the reconfigurable circuit portion 1004 and the general-use processor core are provided as one DRP. In addition, the DRP includes a memory such as a RAM (Random Access Memory), and an input/output circuit for inputting and outputting data to/from an external device. It is a matter of course that some of these hardware elements may be integrated on one integrated circuit. Not to say, this is only an example. Another reconfigurable processor architecture may be used.

A data input portion 1002 is a unit for supplying input data to a processing circuit reconfigured on the reconfigurable circuit portion 1004. An example of the data input portion 1002 includes buffer areas for input data, which areas are secured on a memory connected to the reconfigurable circuit portion 1004. In this case, in order to allow the DRP in this exemplary embodiment to execute a process for decoding a compressed image, a host system (for example, a CPU of a computer where the DRP is mounted) transfers to-be-processed compressed image data as input data to those buffer areas, and gives the reconfiguration control portion 1008 an instruction to process the input data. In response to the instruction, the reconfiguration control portion 1008 supplies the input data from the data input portion 1002 to an image data decoding circuit configured on the reconfigurable circuit portion 1004. Another example will be shown. That is, data may be transferred from the host system to the DRP in this exemplary embodiment by DMA (Direct Memory Access). In this case, for example, the data input portion 1002 corresponds to a channel assigned by a DMA controller (not shown) in the data processing device.

A data output portion 1006 is a unit for outputting, to the host system, data supplied from the image data decoding circuit reconfigured on the reconfigurable circuit portion 1004. Specific examples of the data output portion 1006 may include an output buffer secured on a memory connected to the reconfigurable circuit portion 1004, an output channel assigned by the DMA controller, etc. in the same manner as the aforementioned examples of the data input portion 1002.

The reconfiguration control portion 1008 controls the connection relationship among the circuit elements in the reconfigurable circuit portion 1004 so as to reconfigure a circuit for various kinds of data processing on the reconfigurable circuit portion 1004. In addition, the reconfiguration control portion 1008 makes control to supply input data to the circuit reconfigured on the reconfigurable circuit portion 1004 through the data input portion 1002 in accordance with an instruction from the host system and to return output data from the reconfigured circuit to the host system through the data output portion 1006.

The circuit reconfiguration in the reconfigurable circuit portion 1004 is performed in accordance with configuration data stored in a configuration data storage portion 1010. In this example, configuration data A 1012a and configuration data B 1012b expressing the configurations A and B shown in FIGS. 8 and 9 respectively are stored in the configuration data storage portion 1010. For example, the configuration data storage portion 1010 is configured on a memory device such as a RAM or a nonvolatile memory in the DRP. Under the control of the host system, new configuration data can be added to the configuration data storage portion 101 or existing configuration data can be deleted therefrom.

On receiving a reconfiguration request from the circuit configured on the reconfigurable circuit portion 1004, the reconfiguration control portion 1008 issues, to the next configuration data selection portion 1014, an instruction to select configuration data corresponding to the request.

The next configuration data selection portion 1014 is a unit for selecting configuration data defining a configuration which should be reconfigured next on the reconfigurable circuit portion 1004. Control information indicating conditions for applying each configuration data stored in the configuration data storage portion 1010 to the reconfigurable circuit portion 1004 is beforehand set in the next configuration data selection portion 1014 by the host system. On receiving an instruction from the reconfiguration control portion 1008, the next configuration data selection portion 1014 reads configuration data corresponding to the instruction from the configuration data storage portion 1010 in accordance with the control information. When processing of a current configuration configured on the reconfigurable circuit portion 1004 is terminated, the next configuration data selection portion 1014 writes the read configuration data onto the reconfigurable circuit portion 1004 so as to switch the reconfigurable circuit portion 1004 to the next circuit configuration.

A configuration memory provided with a plurality of banks may be provided in the reconfigurable circuit portion 1004 in the same manner as in the aforementioned DAP DNA architecture, so that configuration data can be stored in each bank and circuit reconfiguration can be achieved by sequentially switching banks for use. For example, when configuration data more than the number of banks in the configuration memory are used, configuration data in each bank may be rewritten in turn into configuration data in the configuration data storage portion 1010.

In such a DRP configuration, the configuration A is first configured in the reconfigurable circuit portion 1004 at the beginning of decoding. Then, on arrival of a reconfiguration request from the background data determination portion 110a for the configuration A, the reconfiguration control portion 1008 rewrites the circuit in the reconfigurable circuit portion 1004 into the configuration B. On the other hand, on arrival of a reconfiguration request from the background data determination portion 110b for the configuration B, the reconfiguration control portion 1008 rewrites the circuit in the reconfigurable circuit portion 1004 into the configuration A. Thus, a function equivalent to that in the device of FIG. 1 can be implemented by switching between the configurations A and B.

In order to deal with the case where each DC component is differentially coded, for example, it will go well if at least a circuit for holding the latest DC component value, of the background data determination portions 110a and 110b for the configurations A and B, is shared and the circuit keeps the value without updating the value in spite of switching between the configurations A and B. Alternatively, a determination portion also having the functions of the background data determination portions 110a and 110b may be used to be shared between the configurations A and B. In this case, this determination portion is not rewritten.

Next, a modification of the image data decoding device according to the exemplary embodiment will be described with reference to FIG. 11. This modification shows a device configuration having a decoding system for the case where AC components are shared between adjacent blocks, in addition to two decoding systems, that is, a JPEG decoding system and a background data decoding system shown in FIG. 1.

Figure 11:
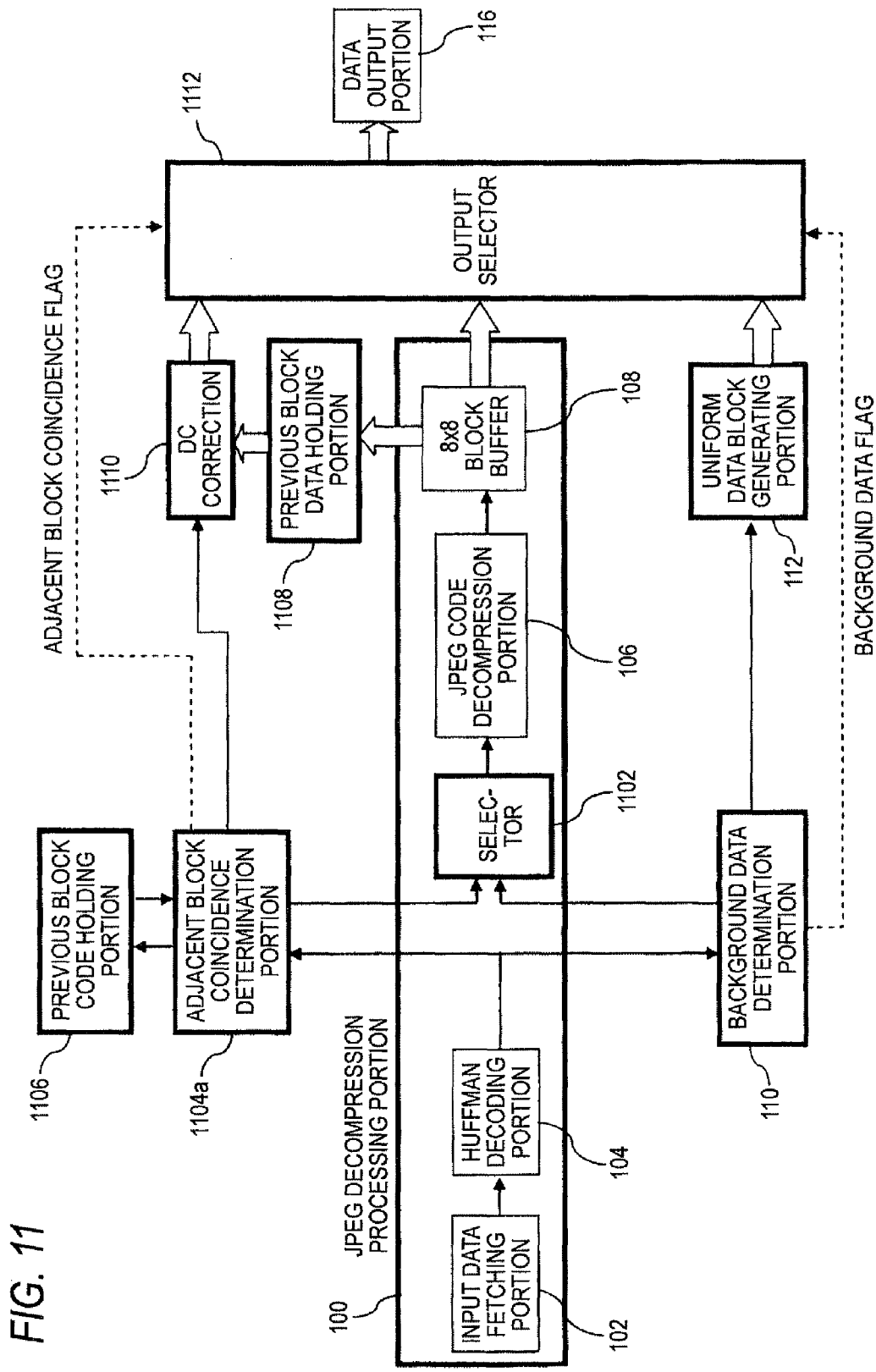
FIG. 11 is a diagram showing an example of a configuration of an image data decoding device according to a modification.

That is, the device of FIG. 11 includes not only the respective elements shown in FIG. 1 but also an adjacent block coincidence determination portion 1104, a previous block code holding portion 1106, a previous block data holding portion 1108 and a DC correction portion 1110. In addition, since there are three decoding systems in this modification, an output selector 1112 selects any one of the three systems. In addition, the JPEG decompression processing portion 100 is provided with a selector 1102 which selects one of block data (DC component and AC components) supplied from the background data determination portion 110 and the adjacent block coincidence determination portion 1104 and supplies the selected block data to the JPEG code decompression portion 106.

The adjacent block coincidence determination portion 1104 determines whether AC components obtained as a Huffman-decoded result of a current block supplied from the Huffman decoding portion 104 coincide with AC components of a block (referred to as "previous block") supplied immediately before the current block or not. In this determination, it is determined whether whole AC components (that is, whole frequency components) in the current block perfectly coincide with those in the previous block or not. When the whole AC components in the current block coincide with those in the previous block, all the frequency components other than the DC component in the current block are the same as those in the previous block.

In addition, the adjacent block coincidence determination portion 1104 supplies an adjacent block coincidence flag indicating a result of determination to the output selector 1112.

The previous block code holding portion 1106 holds codes (that is, a DC component and AC components (whole frequency components)) of a previous block for determination in the adjacent block coincidence determination portion 1104. The codes held in the previous block code holding portion 1106 are updated with latest ones successively whenever a block is decoded.

The previous block data holding portion 1108 holds a copy of a set of pixel values corresponding to one block decompressed by the JPEG code decompression portion 106 and held by the 8×8 block buffer 108. The set of pixel values corresponding to one block held by the previous block data holding portion 1108 are updated with the latest ones successively whenever a block is decoded.

The DC correction portion 1110 obtains and outputs each pixel value of a current block by correcting each pixel value of a previous block held by the previous block data holding portion 1108 in accordance with a DC differential value supplied from the adjacent block coincidence determination portion 1104.

The output selector 1112 selects one of the three decoding systems based on the background data flag supplied from the background data determination portion 110 and the adjacent block coincidence flag supplied from the adjacent block coincidence determination portion 1104, and outputs a decoded result of the selected system to the data output portion 116.

In the configuration of FIG. 11, processing performed by the DC correction portion 1110 is only to add one and the same DC differential value to each piece of data of 64 pixels of one block held by the previous block data holding portion 1108. Thus, the processing can be executed in one clock. Therefore, the processing is much higher in speed than that in the JPEG code decompression portion 106 needing one clock per pixel. In addition, when the decoding system added newly in this modification is mounted as a hardware circuit, the circuit scale thereof is also much smaller than that of the JPEG code decompression circuit 106 performing normal JPEG decoding. The total circuit scale of FIG. 11 is smaller than in the case where two JPEG decompression processing portions 100 are disposed in parallel as two systems.

Figure 12:
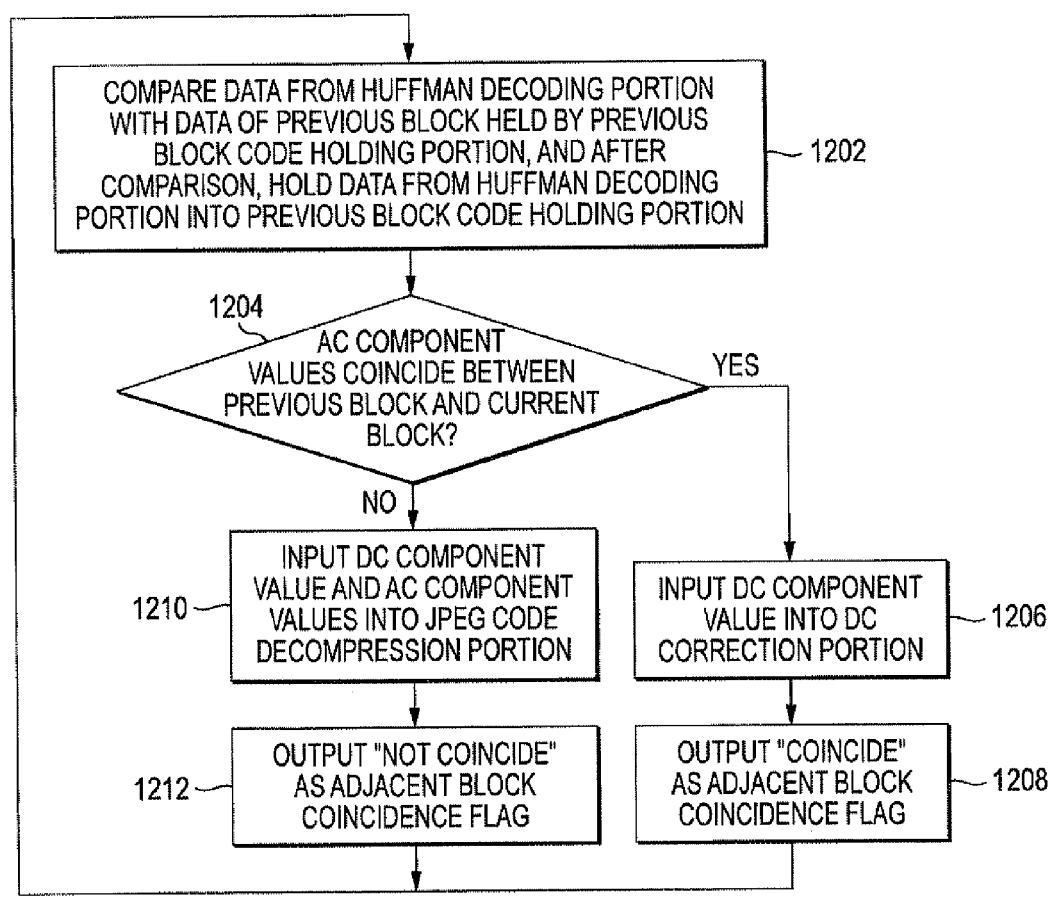
FIG. 12 is a flow chart showing an example of a processing procedure in an adjacent block coincidence determination portion in the modification.

Next, an example of the processing procedure of the adjacent block coincidence determination portion 1104 will be described with reference to FIG. 12. In this procedure, whenever a decoded result of one block (current block) is received from the Huffman decoding portion 104, the adjacent block coincidence determination portion 1104 compares whole AC components of the decoded result with whole AC components of a previous block held by the previous block code holding portion 1106 (1202). After the comparison, the codes in the previous block code holding portion 1106 are replaced with the decoded result (DC component and AC components) of the current block.

Next, as a result of comparison in Step 1202, the adjacent block coincidence determination portion 1104 determines whether the whole AC components in the current block coincide with the whole AC components in the previous block or not (1204). When the whole AC components are determined as "coincide" in Step 1204, the adjacent block coincidence determination portion 1104 obtains a difference between the DC component of the previous block held by the previous block code holding portion 1106 and the DC component of the current block and supplies the DC difference to the DC correction portion 1110 (1206). The DC correction portion 1110, for example, adds the value of the DC difference to each pixel value of the previous block held by the previous block data holding portion 1108 to obtain and output each pixel value of the current block. In addition, the adjacent block coincidence determination portion 1104 outputs, to the output selector 1112, an adjacent block coincidence flag whose value indicates that AC components "coincide" between the current block and the previous block (1208). The order of Steps 1206 and 1208 may not be limited to that in this example.

On the other hand, in the case of "not coincide" as a result of determination in Step 1204, the adjacent block coincidence determination portion 1104 supplies the DC component value and the AC component values of the current block to the JPEG code decompression portion 106 (1210), and outputs, to the output selector 1112, an adjacent block coincidence flag whose value indicates that AC components do "not coincide" between the current block and the previous block (1212) (the order of Steps 1210 and 1212 may not be limited to the aforementioned order).

Figure 13:
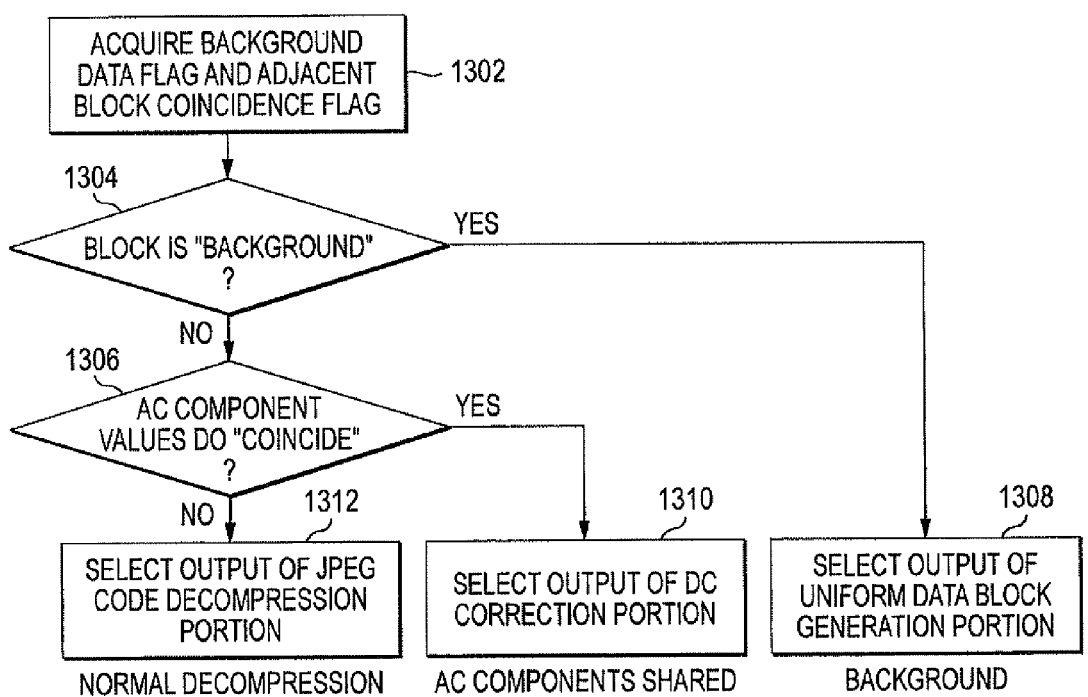
FIG. 13 is a flow chart showing an example of a processing procedure in an output selector in the modification.

Next, the operation of the output selector 1112 will be described with reference to FIG. 13. On receiving a background data flag and an adjacent block coincidence flag about a current block respectively from the background data determination portion 110 and the adjacent block coincidence determination portion 1104 (1302), the output selector 1112 first determines the value of the background data flag (1304). When the value of the background data flag indicates "background" as a result of the determination, the output selector 1112 selects the output of the decoding system for background data, that is, the output of the uniform data block generating portion 112 (1308). On the other hand, when the value of the background data flag indicates "not background", the output selector 1112 further determines the value of the adjacent block coincidence flag (1306). When the value of the adjacent block coincidence flag indicates "coincide" as a result of the determination, the output selector 1112 selects the output of the decoding system for the case where AC components are shared between adjacent blocks, that is, the output of the DC correction portion 1110 (1310). When the value of the adjacent block coincidence flag indicates "not coincide" as a result of the determination in Step 1306, the output selector 1112 selects the output of the normal JPEG decoding system, that is, the output of the 8×8 block buffer 108 (1312). In the switching operation, priority is given to the output of the decoding system for background data when the current block is "background" and the AC components of the previous block coincide with those of the current block. This shows an example in the case where the processing in the decoding system for background data is higher than that in the decoding system for the case where AC components are shared between adjacent blocks.

Here, the procedures of operations of the adjacent block coincidence determination portion 1104 and the output selector 1112 have been shown. As is obvious to those skilled in the art, those procedures may be mounted as logical circuits of hardware.

For example, when the determination result of the background data determination portion 110 is "not background" and the determination result of the adjacent block coincidence determination portion 1104 is "not coincide", the selector 1102 in the JPEG decompression processing portion 100 supplies, to the JPEG code decompression portion 106, either the DC component and the AC components of the current block supplied from the background data determination portion 110 or those supplied from the adjacent block coincidence determination portion 1104 (any one may be selected in this case because the DC component and the AC components supplied from the background data determination portion 110 coincide with those supplied from the adjacent block coincidence determination portion 1104). On the other hand, when the determination results "background" and "coincide" are obtained, pixel values of the current block are obtained by the uniform data block generating portion 112 or the DC correction portion 1110. Thus, the selector 1102 may prevent the DC component and the AC components supplied from the background data determination portion 110 or the adjacent block coincidence determination portion 1104 in accordance with those determination results from being supplied to the JPEG code decompression portion 106.

In the image data decoding device according to this modification, decoding is processed at a higher speed than normal JPEG-decoding even when the AC components of the current block coincide with the AC components of the previous block.

Next, an example in which the image data decoding device according to this modification is mounted on a DRP will be described. In this mounting on the DRP, assume that the normal JPEG decoding system, the decoding system for background data and the decoding system for the case where AC components are shared between adjacent blocks correspond to independent configurations respectively.

Figure 14:
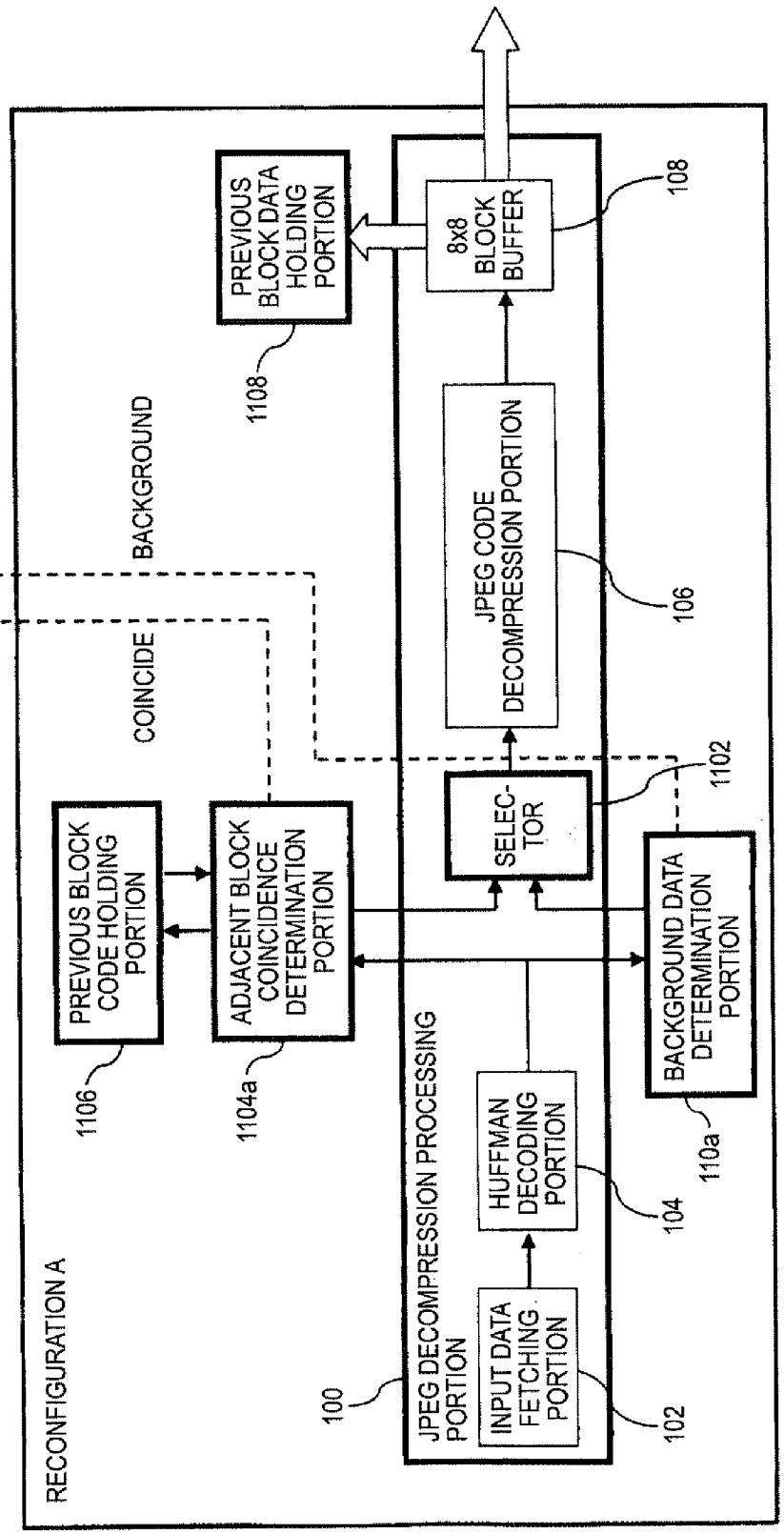
FIG. 14 is a diagram showing an example of a configuration which performs normal JPEG decompression when the image data decoding device according to the modification is divided into a plurality of configurations to be mounted on a DRP.

The normal JPEG decoding system is mounted as a configuration A shown in FIG. 14. The configuration A corresponds to a part of the device configuration of FIG. 11 constituted by the JPEG decompression processing portion 100, the adjacent block coincidence determination portion 1104a, the previous block code holding portion 1106, the previous block data holding portion 1108 and the background data determination portion 110a.

In the same manner as the background data determination portion 110 in FIG. 1, the background data determination portion 110a determines whether a block supplied from the Huffman decoding portion 104 is "background" or not and supplies a DC component value and AC component values of the block to the JPEG code decompression portion 106 when the block is determined as "not background". The background data determination portion 110a is different from the background data determination portion 110 in FIG. 1 as follows. That is, when the block is determined as "background", the background data determination portion 110a issues, to the reconfiguration control portion 1008, a reconfiguration request to switch to a configuration B for background data.

In the same manner as the adjacent block coincidence determination portion 1104 in FIG. 11, the adjacent block coincidence determination portion 1104a determines whether the AC components of the current block supplied from the Huffman decoding portion 104 "coincide" with those of the previous block or not, and supplies the DC component value and the AC component values of the current block to the JPEG code decompression portion 106 when the AC components are determined as "not coincide". The adjacent block coincidence determination portion 1104a is different from the adjacent block coincidence determination portion 1104 in FIG. 11 as follows. That is, when the AC components are determined as "coincide", the adjacent block coincidence determination portion 1104a issues, to the reconfiguration control portion 1008, a reconfiguration request to switch to a configuration C (in FIG. 15, which will be described in detail later) serving as the decoding system for the case where AC components are shared between adjacent blocks.

The previous block code holding portion 1106 and the previous block data holding portion 1108 are the same as those shown in FIG. 11. The previous block code holding portion 1106 and the previous block data holding portion 1108 are provided for transmitting codes and pixel values as a Huffman-decoded result of the previous block to the circuit of the configuration C. That is, data stored in the previous block code holding portion 1106 and the previous block data holding portion 1108 are kept and maintained as they are even when the configuration A has been rewritten into the configuration C.

The configuration B which is the decoding system for background data may be the same as that shown in FIG. 9.

Figure 15:
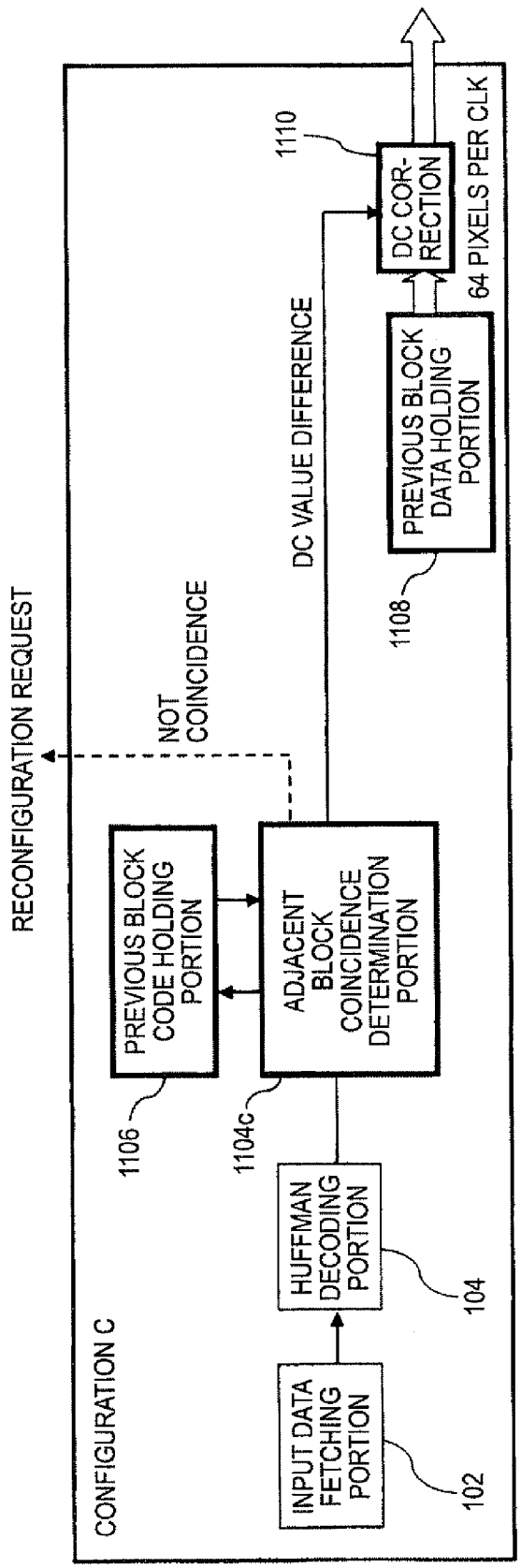
FIG. 15 is a diagram showing an example of a configuration which performs decompression on a block having the same AC components as an adjacent block when the image data decoding device according to the modification is divided into a plurality of configurations to be mounted on a DRP.

The decoding system for the case where AC components are shared between adjacent blocks is mounted as the configuration C in FIG. 15. The configuration C has an input data fetching portion 102, a Huffman decoding portion 104, an adjacent block coincidence determination portion 1104c, a previous block code holding portion 1106, a previous block data holding portion 1108 and a DC correction portion 1110. All the portions but the adjacent block coincidence determination portion 1104c may be identical to those elements with the same reference numerals shown in FIG. 11 respectively. In the same manner as the adjacent block coincidence determination portion 1104 in FIG. 11, the adjacent block coincidence determination portion 1104c determines whether AC components of a current block supplied from the Huffman decoding portion 104 "coincide" with those of a previous block or not, and supplies a differential value between the DC component of the current block and the DC component of the previous block to the DC correction portion 1110 when the AC components are determined as "coincide". The adjacent block coincidence determination portion 1104c is different from the adjacent block coincidence determination portion 1104 in FIG. 11 as follows. That is, when the AC components are determined as "not coincide", the adjacent block coincidence determination portion 1104c issues, to the reconfiguration control portion 1008, a reconfiguration request to switch to the configuration A serving as the normal JPEG decoding system.

The adjacent block coincidence determination portion 1104c may be provided with a circuit or a function for further determining whether the block is background or not (that is, whether a DC component is followed directly by an EOB marker or not) so that the case where the AC components of the current block do "not coincide" with those of the previous block can be further segmented into the case of "not coincide" and "background" and the case of "not coincide" and "not background". In this example, the adjacent block coincidence determination portion 1104c may issue a reconfiguration request to switch to the configuration A serving as the normal JPEG decoding system in the case of "not coincide" and "not background", and a reconfiguration request to switch to the configuration B serving as the decoding system for background data in the case of "not coincide" and "background".

The DRP for switching among the three configurations A, B and C may be similar to that shown in FIG. 10. Incidentally, data of the three configurations A, B and C are stored in the configuration data storage portion 1010.

Figure 16:
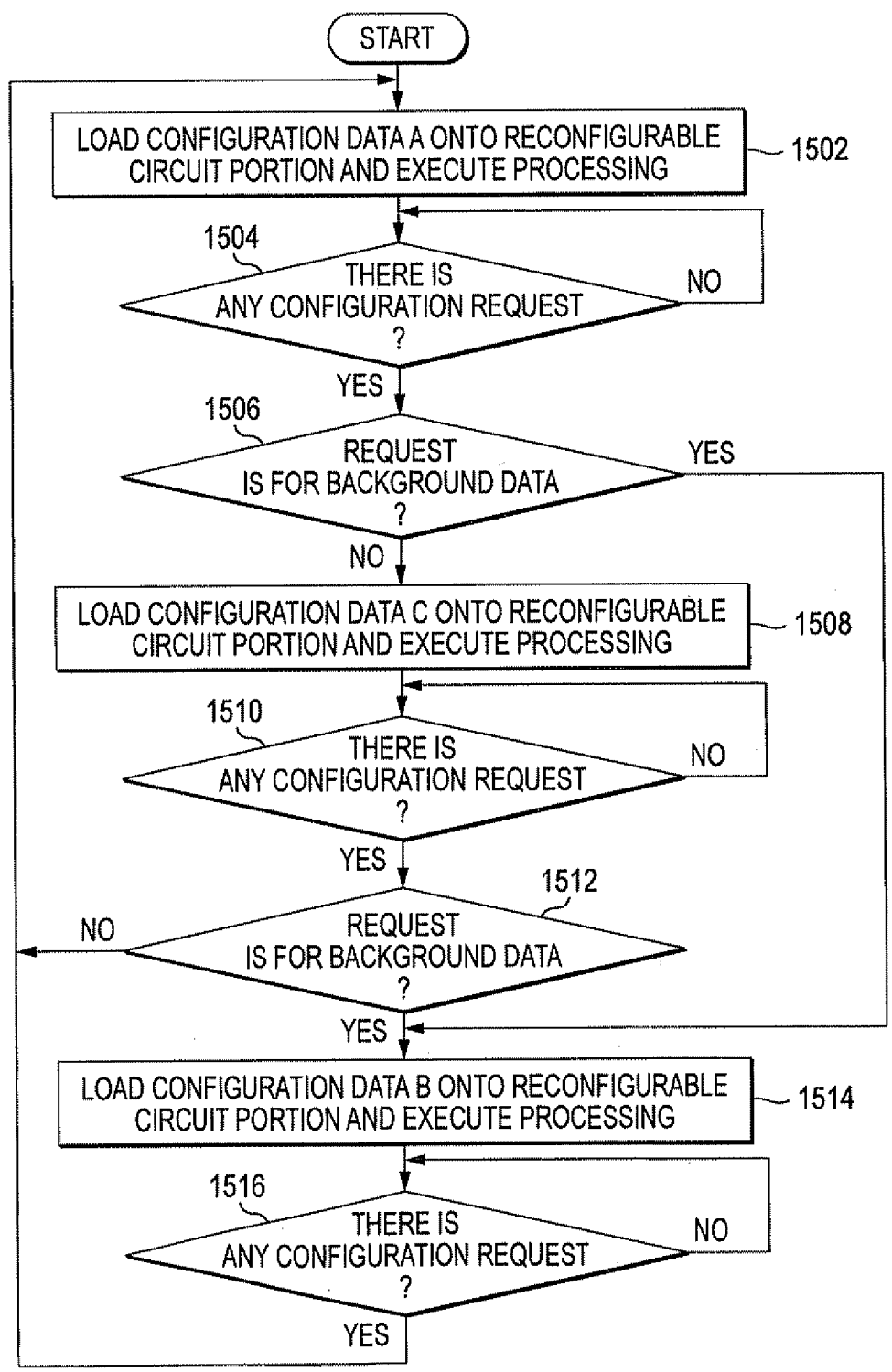
FIG. 16 is a flow chart showing an example of a processing procedure in a reconfiguration control portion when the image data decoding device according to the modification is mounted on a DRP.

The procedure of processing in the reconfiguration control portion 1008 in this example will be described with reference to FIG. 16. In this procedure, in response to an instruction to decode compressed image data, the reconfiguration control portion 1008 loads data of the configuration A onto the reconfigurable circuit portion 1004 (that is, reconfigures the reconfigurable circuit portion 1004 into the configuration A) so as to make the configuration A execute a decoding process (1502). Thus, the circuit of the configuration A proceeds with the decoding process. The reconfiguration control portion 1008 monitors arrival of a reconfiguration request from the background data determination portion 110a or the adjacent block coincidence determination portion 1104a (1504). On arrival of a reconfiguration request, the reconfiguration control portion 1008 determines into which system the request is for reconfiguration, the decoding system for background data (configuration B) or the decoding system for the case where AC components are shared between adjacent blocks (configuration C) (1506). When the request is for reconfiguration into the decoding system for background data, the reconfiguration control portion 1008 loads data of the configuration B onto the reconfigurable circuit portion 1004 so as to make the configuration B execute a decoding process (1514). After that, the reconfiguration control portion 1008 monitors arrival of a reconfiguration request from the background data determination portion 110*b* (1516). The reconfiguration request from the background data determination portion 110*b* is merely for shift to the configuration A. Accordingly, on arrival of the reconfiguration request, the reconfiguration control portion 1008 returns to Step 1502 and loads the data of the configuration A onto the reconfigurable circuit portion 1004.

When it is concluded in Step 1506 that the reconfiguration request is not a request for reconfiguration into the decoding system for background data, the reconfiguration control portion 1008 loads data of the configuration C provided with the adjacent block coincidence determination portion 1104*c* onto the reconfigurable circuit portion 1004 so as to make the configuration C execute a decoding process (1508). After that, the reconfiguration control portion 1008 monitors arrival of a reconfiguration request from the adjacent block coincidence determination portion 1104*c* (1510). When the adjacent block coincidence determination portion 1104*c* has a function of issuing two kinds of requests, one of which is a request for shift to the configuration A and the other of which is a request for shift to the configuration B, the reconfiguration control portion 1008 determines which request is given (1512). The reconfiguration control portion 1008 moves to Step 1502 when the request for shift to the configuration A is given, and moves to Step 1514 when the request for shift to the configuration B is given.

The exemplary embodiment and its modification have been described above. In the aforementioned examples, description has been made in the cases where the image data decoding devices according to the exemplary embodiment and its modification are mounted on DRPs respectively by way of example. The configurations of FIGS. 1 and 11 may be mounted not only on DRPs but also as various types of circuits including normal integrated circuits such as ICs (Integrated Circuits), LSIs (Large Scale Integrated circuits), ASICs (Application Specific ICs), etc., programmable logic circuits such as FPGAs (Field Programmable Gate Arrays), etc.

The aforementioned description has been made in the cases where JPEG is used as a method for compressing image data by way of example. However, the method of this exemplary embodiment may be applied not only to JPEG but also generally to compression coding methods dealing with compressed image data which include information of one DC component and information of frequency components other than the DC component for each block and which includes only the information of the DC component and a block end code for each block where all the frequency components other than the DC component are zero. Here, the DC component is not always limited to a component in which the frequency is perfectly zero, but may be a lowest frequency component which is obtained by frequency analysis in the compression coding method. In addition, the frequency analysis is not limited to DCT used in JPEG, but another method such as a wavelet transform may be used.

The image data decoding device which has been described above may be incorporated in an apparatus with a function of decoding compressed data of still images, such as a copying machine, a printer, a complex machine (a multi-functional machine with a function serving as a printer, a scanner, a copying machine, a facsimile machine, etc.), a digital camera, etc.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. An image data decoding device comprising:
an image processing circuit configured to act as:
a determination unit that receives compressed image data including information of one DC component, information of frequency components other than the DC component and a block end code for each block of an image as a result of frequency analysis of pixel values in each of the blocks and that determines each of the blocks of the received compressed image data sequentially in order from a head block of the blocks as to whether the block consists of: 1) the DC component, at least one AC component and the block end code or 2) the DC component and the block end code without any AC components;
a first pixel value generating unit that performs inverse operation to the frequency analysis on the DC component and the frequency components other than the DC component included in each block so as to generate pixel values of the block when the block is determined as consisting of the DC component, at least one AC component and the block end code by the determination unit; and
a second pixel value generating unit that generates one and the same pixel value for all pixels of each block based on information of the DC component when the block is determined as consisting of the DC component and a block end code without any AC components by the determination unit.

2. The image data decoding device according to claim 1 further comprising:
a reconfigurable circuit; and
a reconfiguration control unit that controls the reconfigurable circuit to reconfigure a first circuit configuration and a second circuit configuration mutually exclusively on the reconfigurable circuit, the first circuit configuration including a circuit of the determination unit and a circuit of the first pixel value generating unit, the second circuit configuration including the circuit of the determination unit and a circuit of the second pixel value generating unit; wherein:
(a) when the block is determined as consisting of the DC component and the block end code by the circuit of the determination unit of the first circuit configuration reconfigured on the reconfigurable circuit, the reconfiguration control unit reconfigures the second circuit configuration in place of the first circuit configuration on the reconfigurable circuit, and makes the circuit of the second pixel value generating unit of the reconfigured second circuit configuration generate one and the same pixel value based on information of the DC component; and (b) when the block is determined as not consisting of the DC component and the block end code by the circuit of the determination unit of the second circuit configuration reconfigured on the reconfigurable circuit, the reconfiguration control unit reconfigures the first circuit configuration in place of the second circuit configuration on the reconfigurable circuit, and makes the circuit of the first pixel value generating unit of the reconfigured first circuit configuration perform the inverse operation on the DC component and the frequency components other than the DC component included in the block so as to generate pixel values of the block.

3. The image data decoding device according to claim 1 further comprising:

a second determination unit that determines each block of the received compressed image data sequentially in order from the head block as to whether the frequency components other than the DC component in the block coincide with frequency components other than a DC component in a previous block or not;

a holding unit the holds the pixel values of the block generated by the first pixel value generating unit till pixel values of a block following the block are generated; and a third pixel value generating unit that generates pixel values of the block based on pixel values of the previous block held by the holding unit and a difference in DC component between the block and the previous block when the frequency components other than the DC component in the block are determined as coinciding with the frequency components other than the DC component in the previous block.

4. The image data decoding device according to claim 3, further comprising:

a reconfigurable circuit; and a reconfiguration control unit that makes control to reconfigure a first circuit configuration, a second circuit configuration and a third circuit configuration mutually exclusively on the reconfigurable circuit, the first circuit configuration including a circuit of the determination unit, a circuit of the second determination unit, a circuit of the first pixel value generating unit and a circuit of the holding unit, the second circuit configuration including the circuit of the determination unit and a circuit of the second pixel value generating unit, the third circuit configuration including the circuit of the second determination unit, a circuit of the third pixel value generating unit and the circuit of the holding unit; wherein:

(a) when the block is determined as consisting of the DC component and the block end code by the circuit of the determination unit of the first circuit configuration reconfigured on the reconfigurable circuit, the reconfiguration control unit reconfigures the second circuit configuration in place of the first circuit configuration on the reconfigurable circuit, and makes the circuit of the second pixel value generating unit of the reconfigured second circuit configuration generate one and the same pixel value based on information of the DC component;

(b) when the frequency components other than the DC component in the block are determined as coinciding with the frequency components other than the DC component in the previous block by the circuit of the second determination unit of the first circuit configuration reconfigured on the reconfigurable circuit, the reconfiguration control unit leaves only the circuit of the holding unit of the first circuit configuration on the reconfigurable circuit, reconfigures the third circuit configuration, and makes the circuit of the third pixel value generating unit of the reconfigured third circuit configuration generate pixel values of the block based on pixel values of the previous block held by the circuit of the holding unit and a difference in DC component between the block and the previous block;

(c) when the block is determined as not consisting of a DC component and a block end code by the circuit of the determination unit of the second circuit configuration reconfigured on the reconfigurable circuit, the reconfiguration control unit reconfigures the first circuit configuration in place of the second circuit configuration on the reconfigurable circuit, and makes the circuit of the first pixel value generating unit of the reconfigured first circuit configuration perform the inverse operation on the DC component and the frequency components other than the DC component included in the block so as to generate pixel values of the block; and (d) when the frequency components other than the DC component in the block are determined as coinciding with the frequency components other than the DC component in the previous block by the circuit of the second determination unit of the third circuit configuration reconfigured on the reconfigurable circuit, the reconfiguration control unit reconfigures the first circuit configuration in place of the third circuit configuration on the reconfigurable circuit, and makes the circuit of the first pixel value generating unit of the reconfigured first circuit configuration perform the inverse operation on the DC component and the frequency components other than the DC component included in the block so as to generate pixel values of the block.

* * * * *